US010514859B2

(12) United States Patent
Borlick et al.

(10) Patent No.: US 10,514,859 B2
(45) Date of Patent: *Dec. 24, 2019

(54) REDUCTION OF PROCESSING OVERHEAD FOR POINT IN TIME COPY TO ALLOW ACCESS TO TIME LOCKED DATA

(71) Applicant: INTERNATIONAL BUSINESS MACHINES CORPORATION, Armonk, NY (US)

(72) Inventors: Matthew G. Borlick, Tucson, AZ (US); Lokesh M. Gupta, Tucson, AZ (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/589,373

(22) Filed: May 8, 2017

(65) Prior Publication Data

US 2018/0321850 A1 Nov. 8, 2018

(51) Int. Cl.
*G06F 3/06* (2006.01)

(52) U.S. Cl.
CPC ............ *G06F 3/065* (2013.01); *G06F 3/0604* (2013.01); *G06F 3/067* (2013.01); *G06F 3/0683* (2013.01)

(58) Field of Classification Search
CPC ...... G06F 3/065; G06F 3/0619; G06F 3/0683; G06F 11/2056; G06F 11/1402; G06F 3/06; G06F 17/30; G06F 3/00
See application file for complete search history.

(56) References Cited

U.S. PATENT DOCUMENTS

| 6,389,420 | B1  | 5/2002  | Vahalia et al.         |
|-----------|-----|---------|------------------------|
| 6,711,687 | B1  | 3/2004  | Sekiguchi              |
| 7,010,493 | B2  | 3/2006  | Yamamoto et al.        |
| 7,313,557 | B1  | 12/2007 | Noveck                 |
| 7,340,640 | B1  | 3/2008  | Karr et al.            |
| 8,185,754 | B2  | 5/2012  | Gill et al.            |
| 8,200,774 | B1  | 6/2012  | Redstone et al.        |
| 8,423,505 | B2  | 4/2013  | Chauvet et al.         |
| 8,732,417 | B1* | 5/2014  | Stringham ...... G06F 11/1448 711/162 |
| 8,954,408 | B2  | 2/2015  | Dudgeon et al.         |
| 9,075,762 | B2  | 7/2015  | Lahousse et al.        |
| 9,218,295 | B2  | 12/2015 | Cohen                  |
| 9,697,268 | B1* | 7/2017  | Prater ............ G06F 17/30575 |
| 9,853,949 | B1  | 12/2017 | Stickle et al.         |
| 9,875,041 | B1* | 1/2018  | Redko ............... G06F 3/0619 |

(Continued)

OTHER PUBLICATIONS

U.S. Appl. No. 15/589,324, filed May 8, 2017.

(Continued)

*Primary Examiner* — Yaima Rigol
(74) *Attorney, Agent, or Firm* — Rabindranth Dutta; Konrad Raynes Davda & Victor LLP

(57) ABSTRACT

A computational device generates a point in time copy of one or more regions of a time locked data set, in response to receiving one or more I/O operations directed to the time locked data set. The one or more I/O operations are performed on the point in time copy of the one or more regions of the time locked data set, in response to generating the point in time copy of the one or more regions of the time locked data set.

28 Claims, 10 Drawing Sheets

(56) References Cited

U.S. PATENT DOCUMENTS

| | | |
|---|---|---|
| 2002/0026588 A1 | 2/2002 | Sauvage |
| 2002/0138691 A1 | 9/2002 | Yamamoto et al. |
| 2004/0153691 A1 | 8/2004 | Fujimoto et al. |
| 2005/0050364 A1 | 3/2005 | Feng |
| 2006/0085608 A1 | 4/2006 | Saika |
| 2006/0095682 A1 | 5/2006 | Fuente et al. |
| 2007/0124545 A1 | 5/2007 | Blanchard et al. |
| 2010/0031315 A1 | 2/2010 | Feng et al. |
| 2010/0077165 A1* | 3/2010 | Lu ............... G06F 11/1451 711/162 |
| 2010/0223241 A1 | 9/2010 | Hussain et al. |
| 2010/0250504 A1 | 9/2010 | Balasubramanian et al. |
| 2011/0173154 A1 | 7/2011 | Chauvet et al. |
| 2011/0185136 A1* | 7/2011 | Gavrilov ........... G06F 17/303 711/162 |
| 2011/0185253 A1* | 7/2011 | Resch ............. G06F 11/1448 714/755 |
| 2012/0102350 A1 | 4/2012 | Belluomini et al. |
| 2014/0019699 A1 | 1/2014 | Cohen |
| 2014/0026002 A1 | 1/2014 | Haines |
| 2014/0109182 A1 | 4/2014 | Smith et al. |
| 2015/0100557 A1 | 4/2015 | Golod et al. |
| 2015/0248333 A1* | 9/2015 | Aravot ............. G06F 11/1456 711/162 |
| 2015/0363125 A1 | 12/2015 | Vijayakumari Rajendran Nair et al. |
| 2016/0036788 A1 | 2/2016 | Conrad et al. |
| 2018/0114387 A1 | 4/2018 | Klink et al. |
| 2018/0321849 A1 | 11/2018 | Borlick et al. |
| 2018/0321850 A1 | 11/2018 | Borlick et al. |
| 2018/0321998 A1 | 11/2018 | Borlick et al. |
| 2018/0322071 A1 | 11/2018 | Borlick et al. |

OTHER PUBLICATIONS

U.S. Appl. No. 15/589,341, filed May 8, 2017.
U.S. Appl. No. 15/589,349, filed May 8, 2017.
List of IBM Patents or Patent Applications Treated as Related, dated May 8, 2017, pp. 2.
R.C. Daley, et al., "A General-purpose File System for Secondary Storage," Proceedings of the Nov. 30-Dec. 1, 1965, Fall Joint Computer Conference, Part I, pp. 213-229, ACM, 1965.
"Enhanced Application Security via Time Constrained Functionality," IP.com No. IPCOM000234628D, Jan. 23, 2014, pp. 4.
Office Action dated Oct. 19, 2018, pp. 29, for U.S. Appl. No. 15/589,341.
Office Action dated Sep. 4, 2018, pp. 24, for U.S. Appl. No. 15/589,349.
Office Action dated Dec. 10, 2018, pp. 27, for U.S. Appl. No. 15/589,324.
Response dated Dec. 4, 2018, pp. 12, to Office Action dated Sep. 4, 2018, pp. 24, for U.S. Appl. No. 15/589,349.
Final Office Action dated Jun. 17, 2019, pp. 19, for U.S. Appl. No. 15/589,324.
Notice of Allowance dated Apr. 17, 2019, pp. 27, for U.S. Appl. No. 15/589,341.
Response dated Apr. 24, 2019, pp. 11, to Final Office Action dated Jan. 24, 2019, pp. 16, U.S. Appl. No. 15/589,349.
Final Office Action dated Jan. 24, 2019, pp. 16, U.S. Appl. No. 15/589,349.
Response dated Jan. 8, 2019, pp. 22, to Office Action dated Oct. 19, 2018, pp. 29, for U.S. Appl. No. 15/589,341.
Response dated Mar. 11, 2019, pp. 10, to Office Action dated Dec. 10, 2018, pp. 27, for U.S. Appl. No. 15/589,324.
Notice of Allowance dated Jul. 25, 2019, p. 10, for U.S. Appl. No. 15/589,341.
Notice of Allowance dated Aug. 7, 2019, p. 17, for U.S. Appl. No. 15/589,349.
Response dated Aug. 19, 2019, p. 11, to Final Office Action dated Jun. 17, 2019, p. 19, for U.S. Appl. No. 15/589,324.
Notice of Allowance dated Sep. 3, 2019, p. 13, for U.S. Appl. No. 15/589,324.

* cited by examiner

REDUCTION OF PROCESSING OVERHEAD FOR POINT IN TIME COPY TO ALLOW ACCESS TO TIME LOCKED DATA

BACKGROUND

1. Field

Embodiments relate to reduction of processing overhead for point in time copy to allow access to time locked data.

2. Background

In certain storage system environments, a storage controller (or a storage controller complex) may comprise a plurality of storage servers that are coupled to each other. The storage controller allows host computing systems to perform input/output (I/O) operations with storage devices controlled by the storage controller, where the host computing systems may be referred to as hosts.

In many systems, data on one storage device may be copied to the same or another storage device so that access to data volumes may be provided from two different locations. Point in time copy allows creation of instantaneous, point in time snapshot copies of entire logical volumes or data sets. A point in time copy may involve physically copying all the data from a source volumes to a target volume so that the target volume has a copy of the data as of a point in time. A point in time copy may also be generated by logically creating a copy of the data and then copying data over only when necessary. A point in time copy operations may also be referred to as flash operations. FlashCopy* (FLC) is a type of point in time copy in which nearly instantaneous point in time snapshot copies of entire logical volumes or data sets may be created.

A time lock is a mechanism that locks data for a period of time. U.S. Pat. No. 9,218,295 describes a method for implementing time locks. U.S. Pat. No. 8,185,754 describes a method for time-based storage access. U.S. Pat. No. 7,313,557 describes a multi-protocol lock manager that manages granting, revoking and releasing of various types of locks on files. U.S. Pat. No. 7,010,493 describes a method for managing access to storage resources according to an access time. US patent publication 2015/0363125 describes a method for executing a copy-offload operation. U.S. Pat. No. 9,075,762 describes a method for setting copy permissions for target data in a copy relationship. U.S. Pat. No. 8,954,408 describes a method for allowing writes to complete without obtaining a write lock to a file. US patent publication 2006/0095682 describes a method for lock management for a flash copy image of a region of data in N-way shared storage system.

SUMMARY OF THE PREFERRED EMBODIMENTS

Provided are a method, system, and computer program product in which a computational device generates a point in time copy of one or more regions of a time locked data set, in response to receiving one or more I/O operations directed to the time locked data set. The one or more I/O operations are performed on the point in time copy of the one or more regions of the time locked data set, in response to generating the point in time copy of the one or more regions of the time locked data set. As a result, lesser processing time and fewer storage resources may be needed for point in time copy generation, relative to situations in which a point in time copy is made of the entirety of the time locked data set. Additionally, I/O operations are allowed to be performed even when the data set is time locked.

In additional embodiments, the one or more regions comprise an entirety of the time locked data set. As a result, a point in time copy is made for the entirety of the time locked data set.

In further embodiments, the one or more regions comprise those regions of the time locked data set to which the I/O operations are directed. The point in time copy is generated for a part of the time locked data set, and as a result the time for generating the point in time copy is reduced over situations in which a point in time copy is generated for the entirety of the time locked data set.

In certain embodiments, the generating of the point in time copy of the one or more regions of the time locked data set is performed subsequent to the one or more I/O operations exceeding a predetermined threshold number. As a result, the time consuming task of performing the point in time copy operation for a large volume or volumes is delayed until a sufficient number of I/O operations are pending.

In further embodiments, the computational device prevents the I/O operations to be performed on the time locked data set. As a result, the time locked data set is protected against access.

In certain embodiments, the one or more regions include one or more volumes or parts of volumes in which the time locked data set is stored. As a result, volumes of parts of volumes are used to generate the point in time copy.

In further embodiments, on expiry of a time lock on the time locked data set, additional I/O operations are directed to the time locked data set and not directed to the point in time copy. As a result, the data set is no longer protected from access after expiry of the time lock.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

There may be several reasons for a storage controller to protect data with a time lock. For example, there may be legal reasons to not allow access to data for a certain period of time. In situations where no one accesses certain data during certain periods of time, the time lock may provide a safety mechanism to prevent a breach of access to the data during those times. In certain embodiments, a time lock may be used for data that is no longer needed for foreseeable future but still needs to be retained.

A problem with time locks is that while a time lock is active, no user or process may be able to access the time locked data. There may be situations in which a time lock is needed to prevent access to data, but there may be users or processes that need just a copy of data that they can access, without having access to the original time locked data.

Certain embodiments provide a storage controller to store data received from a host. The storage controller provides time lock mechanisms for data. The storage controller also provides a point in time copy facility for the data, where the data is subject to the time lock. In certain embodiments a point in time copy is generated from the data that is to be time locked, and the point in time copy is allowed to be accessed after the time lock is active.

When a point in time copy is used to allow access to a copy of the time locked data, the generation of the point in time copy of a large data set (e.g., a storage volume) that comprises a time locked data may be very time consuming.

To provide an efficient mechanism to generate a point in time copy of time locked data, in certain embodiments a sequence of "N" I/O operations (e.g., 1000 I/O operations where N=1000) are allowed to accumulate prior to performing the point in time copy of the time locked copy, and in certain embodiments only regions of the time locked copy that are affected by the "N" I/O operations are copied via point in time copy operations. In additional embodiments, specific regions (e.g., selected extents or blocks) of the time locked data are copied via point in time copy operations when necessary, to allow access to a copy of the time locked data.

Exemplary Embodiments

Figure 1:
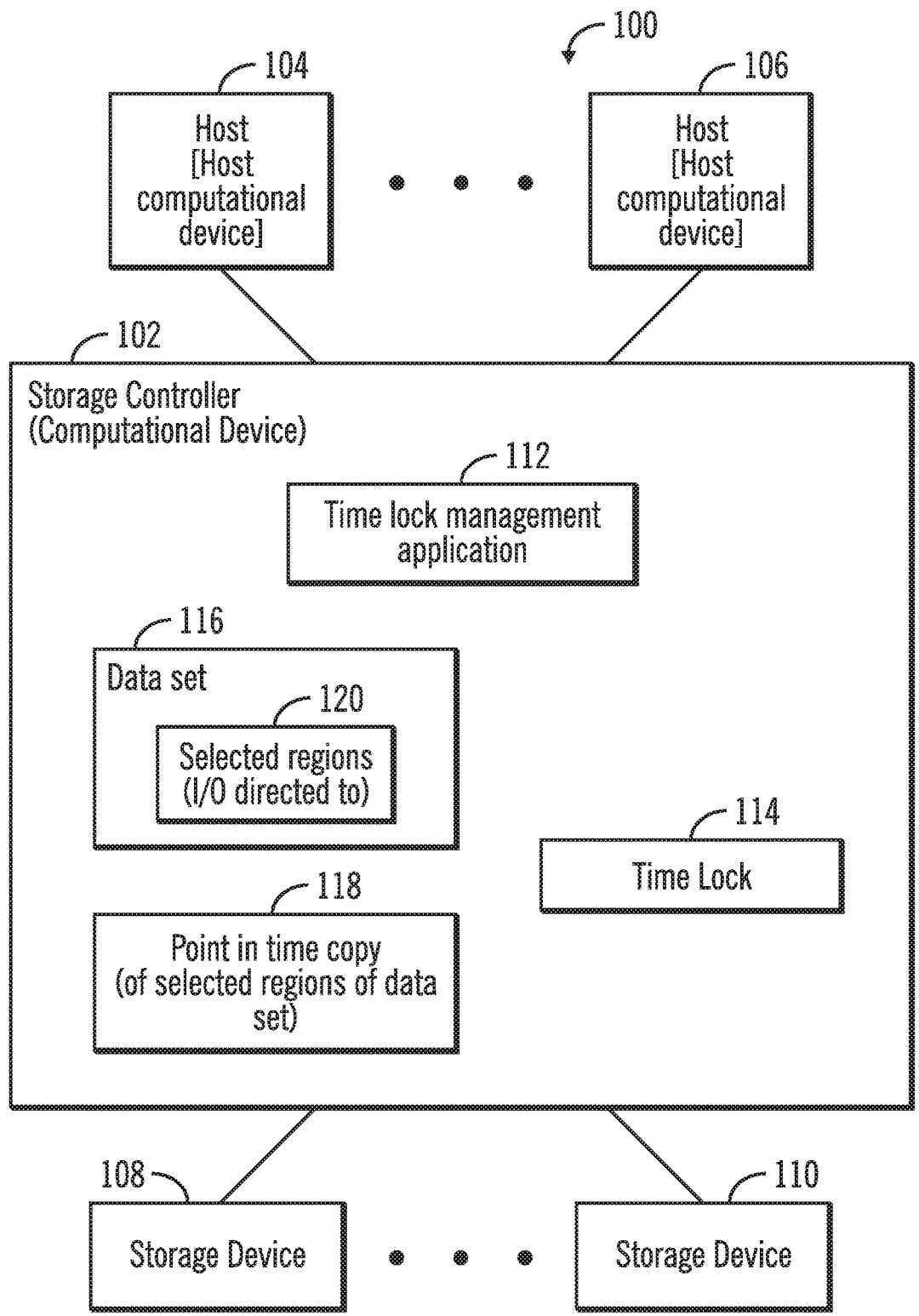
FIG. 1 illustrates a block diagram of a computing environment comprising a storage controller coupled to one or more hosts, and one or more storage devices, for management of time locks, in accordance with certain embodiments.

FIG. 1 illustrates a block diagram of a computing environment 100 comprising a storage controller 102 coupled to one or more hosts 104, 106, and one or more storage devices 108, 110, in accordance with certain embodiments. The storage controller 102 allows the plurality of hosts 104, 106 to perform input/output (I/O) operations with logical storage maintained by the storage controller 102. The physical storage corresponding to the logical storage may be found in one or more of the storage devices 108, 110 of the storage controller 102.

The storage controller 102 and the hosts 104, 106 may comprise any suitable computational device including those presently known in the art, such as, a personal computer, a workstation, a server, a mainframe, a hand held computer, a palm top computer, a telephony device, a network appliance, a blade computer, a processing device, etc. The storage controller 102, the hosts 104, 106, and the storage devices 108, 110 may be elements in any suitable network, such as, a storage area network, a wide area network, the Internet, an intranet. In certain embodiments, the storage controller 102, the hosts 104, 106, and the storage devices 108, 110 may be elements in a cloud computing environment that comprises the computing environment 100. The storage devices 108, 110 may be comprised of storage disks, tape drives, solid state storage, etc., and may be controlled by the storage controller 102.

In certain embodiments, a time lock management application 112 that executes in the storage controller 102 may generate one or more time locks 114 to protect a data set 116 for a predetermined duration of time. The time lock management application 112 may be implemented in software, hardware, firmware or any combination thereof.

In certain embodiments, the time lock management application 112 generates a point in time copy 118 of the data set 116. The time lock 114 is applied to data set 116 and the point in time copy 118 allows access to I/O operations from the hosts 104, 106. If the data 116 is large (e.g., a volume or a plurality of volumes) then the point in time copy 118 may take a significant amount to time and a significant amount to storage space to generate and may impact the performance of the storage controller 102. Certain embodiments provide mechanisms for efficiently generating the point in time copy 118 from the data set 116. This is performed by copying only selected regions 120 of the data set 116 to the point in time copy 118, and/or by waiting to generate the point in time copy 118 till a predetermined number of I/O operations from the host 104, 106 are waiting to access the data set 116. The selected regions 120 of the data set 116 are those blocks or extents or other storage units of the data set 116 that I/O operations attempt to access while the data set 116 is time locked.

Figure 2:
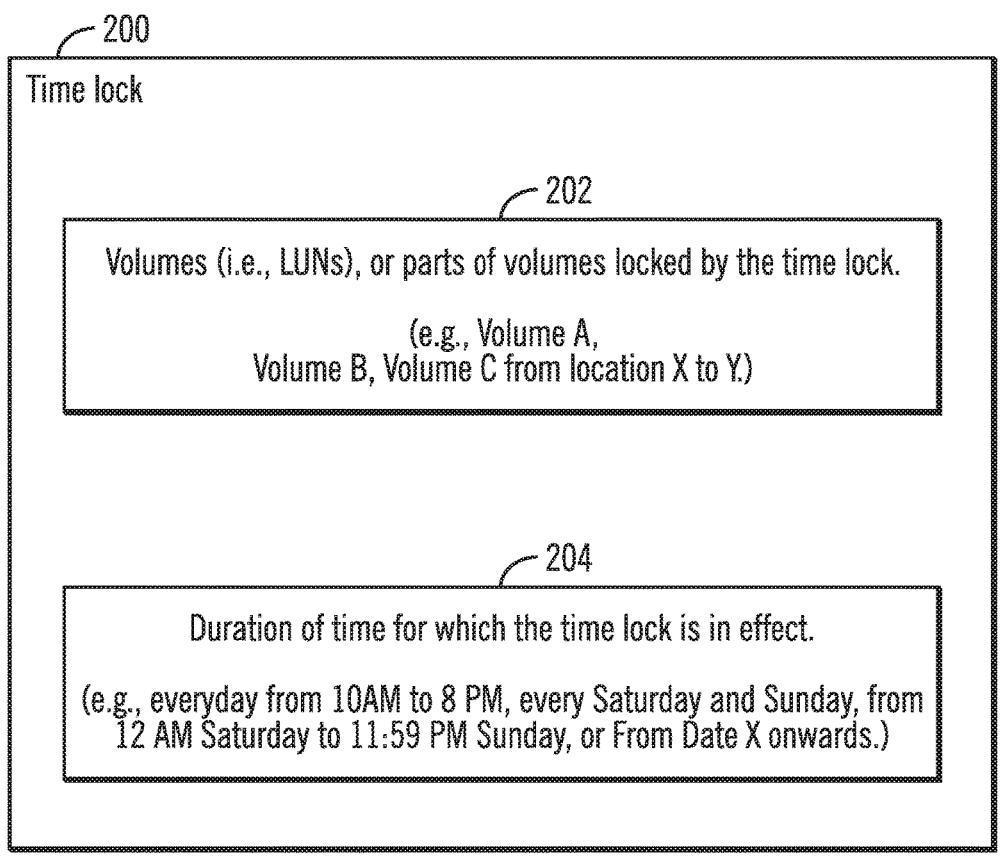
FIG. 2 illustrates a block diagram that shows elements described by an exemplary time lock, in accordance with certain embodiments.

FIG. 2 illustrates elements described by an exemplary time lock 200 that in certain embodiments may comprise the time lock 114 shown in FIG. 1. The time lock 200 may indicate volumes [(i.e., logical units (LUNs)] and/or parts of volumes locked by the time lock 200 (as shown via reference numeral 202). For example, in certain embodiments the time lock 200 may indicate that volume A, volume B, and volume C from location X to location Y are locked by the time lock 200. The data set 116 with which the time lock 114 is associated may be stored in the volumes and/or parts of volumes.

The time lock 200 may also indicate the duration for which the time lock 200 is in effect (as shown via reference numeral 204). For example, in certain embodiments, the time lock 200 may be in effect every day from 10 AM to 8 PM. In other embodiments, the time lock 200 may be in effect for the whole day every Saturday and Sunday. In still further embodiments, the time lock 200 may be in effect from 12 AM Saturday to 11:59 PM Sunday. In yet another embodiment, the time lock may be in effect from Date X onwards (e.g., from Dec. 12, 2017 onwards).

Figure 3:
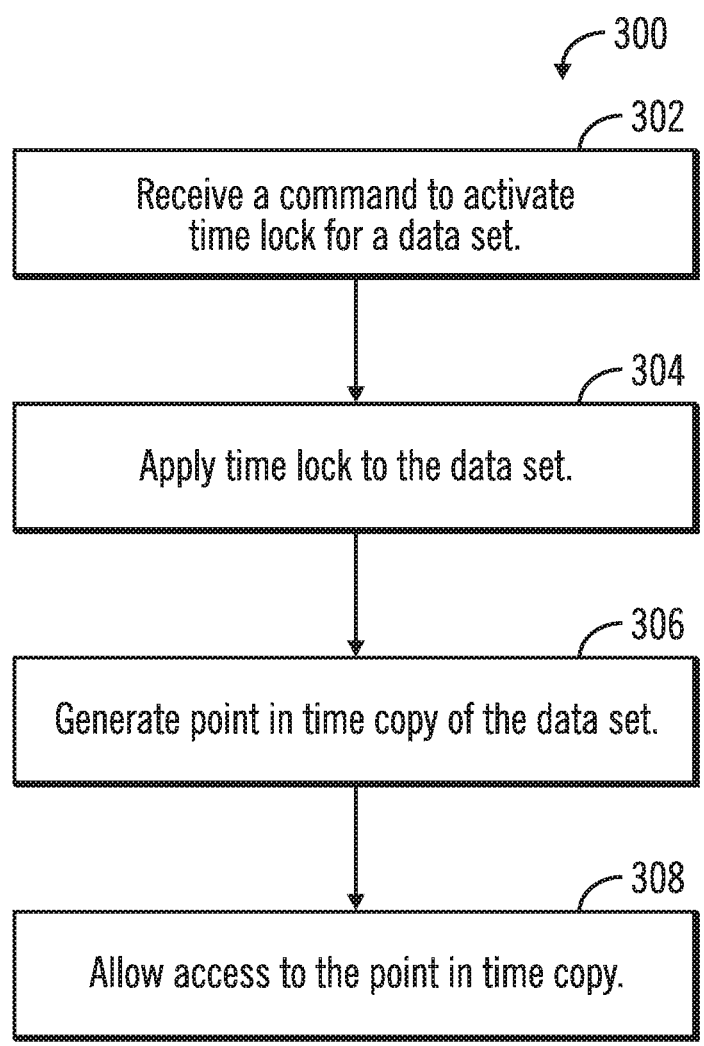
FIG. 3 illustrates a flowchart that shows generating a point in time copy of a time locked data set and allowing access to the point in time copy, in accordance with certain embodiments.

FIG. 3 illustrates a flowchart 300 that shows generating a point in time copy of a data set and then subjecting the data set to a time lock and allowing access to the point in time copy, in accordance with certain embodiments. The operations shown in FIG. 3 may be performed by the time lock management application 112 that executes in the storage controller 102.

Control starts at block 302 in which the time lock management application 112 receives a command to activate a time lock 114 for a data set 116. The time lock management application 112 applies (at block 304) the time lock 114 to the data set 116. Control proceeds to block 306 in which the time lock management application 112 generates the point in time copy 118 of the data set. Subsequent to generation of the point in time copy 118, the time lock management application 112 allows (at block 308) access to I/O operations from the host 104, 106 to the point in time copy 118.

Therefore, FIG. 3 illustrates certain embodiments in which the data set 116 is time locked, and the point in time copy 118 of the data set 116 is allowed to be accessed. I/O operations are not allowed access to the time locked data set 116.

Figure 4:
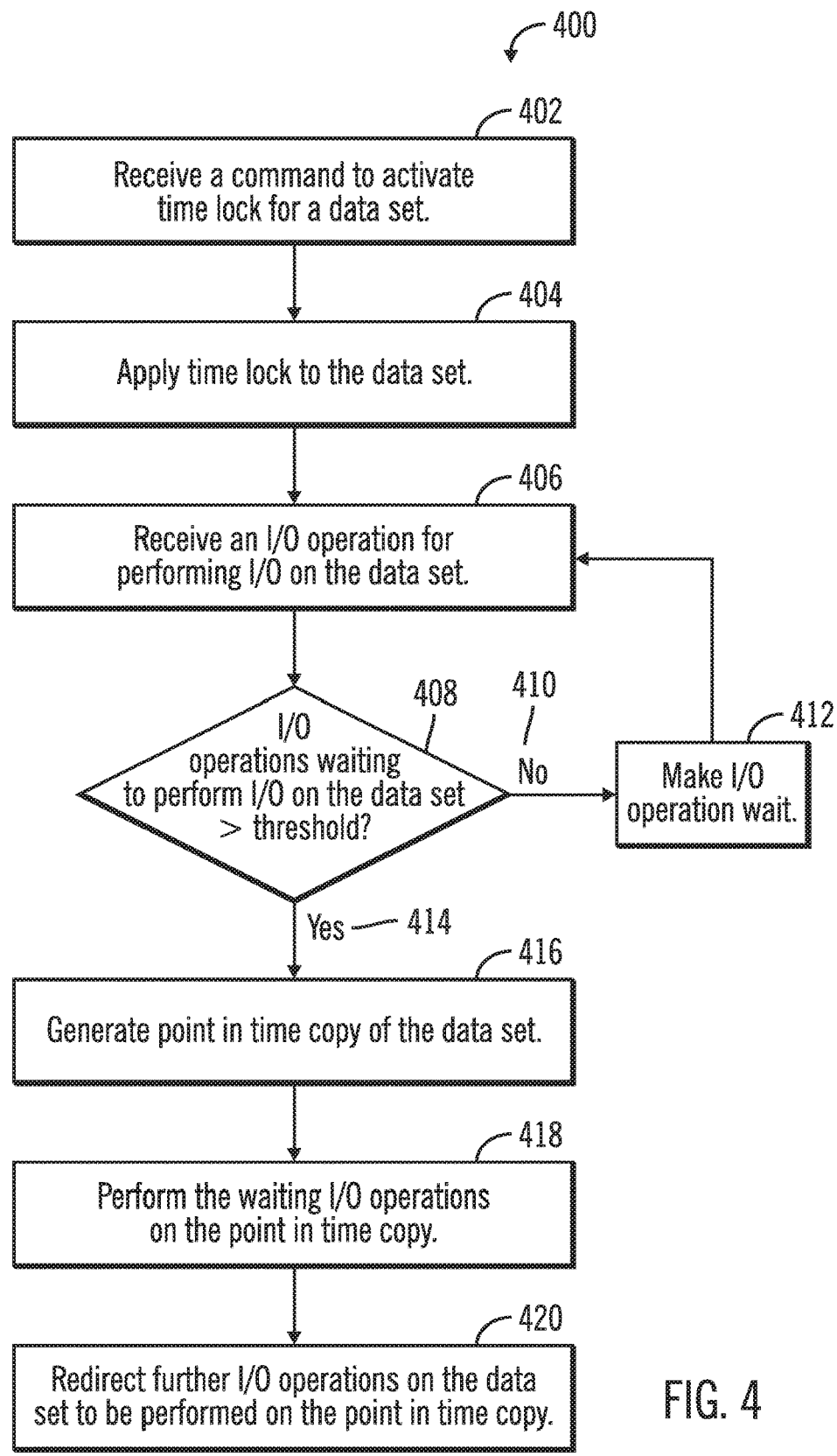
FIG. 4 illustrates a flowchart that shows waiting for a threshold number of I/O operations to be pending, prior to generating the point in time copy of a time locked data set, in accordance with certain embodiments.

FIG. 4 illustrates a flowchart 400 that shows waiting for a threshold number of I/O operations to be pending prior to generating the point in time copy of a time locked data set, in accordance with certain embodiments. The operations shown in FIG. 4 may be performed by the time lock management application 112 that executes in the storage controller 102.

Control starts at block 402 in which the time lock management application 112 receives a command to activate a time lock 114 for a data set 116. The time lock management application 112 applies (at block 404) the time lock 114 to the data set 116. As a result, the data set 116 is time locked and cannot be accessed to perform I/O operations.

From block 404 control proceeds to block 406 in which the time lock management application 112 receives an I/O operation generated by a host for performing I/O on the data set 116. The I/O operation cannot be performed on the data set 116 that is time locked.

The time lock management application 112 determines (at block 408) whether the number of I/O operations waiting to perform I/O on the time locked data set 116 exceeds a threshold, where the threshold may be a predetermined number. For example if the predetermined number is N, then the time lock management application 112 determines (at block 408) whether the number of I/O operations waiting to perform I/O on the data set 116 exceeds the number N.

If at block 408 the time lock management application 112 determines (at block 408) that the number of I/O operations waiting to perform I/O on the data set 116 does not exceeds the threshold ("No" branch 410) then control proceeds to block 412 where the I/O operation is made to wait and then control returns to block 406 where the next I/O operation is received.

If at block 408 the time lock management application 112 determines (at block 408) that the number of I/O operations waiting to perform I/O on the data set exceeds the threshold ("Yes" branch 414) then control proceeds to block 416, in which the time lock management application 112 generates the point in time copy 118 of the data set 116. Therefore, the point in time copy 118 of the time locked data set 116 is generated only after the number of I/O operations waiting to perform I/O on the data set 116 exceeds the threshold. As a result, the generation of the point in time copy 118 is delayed until a sufficient number of I/O operations are waiting.

Subsequent to generation of the point in time copy 118, the time lock management application 112 performs (at block 418) the waiting I/O operations on the point in time copy 118. Further I/O operations on the data set 116 are redirected (at block 420) to be performed on the point in time copy 118.

Therefore, FIG. 4 illustrates certain embodiments in which the generation of the point in time copy 118 is delayed until the number of I/O operations are waiting for execution on the time locked data set 116 exceeds a predetermined threshold. As a result the relatively time consuming generation of the point in time copy 118 is delayed until it becomes necessary to execute the waiting I/O operations.

Figure 5:
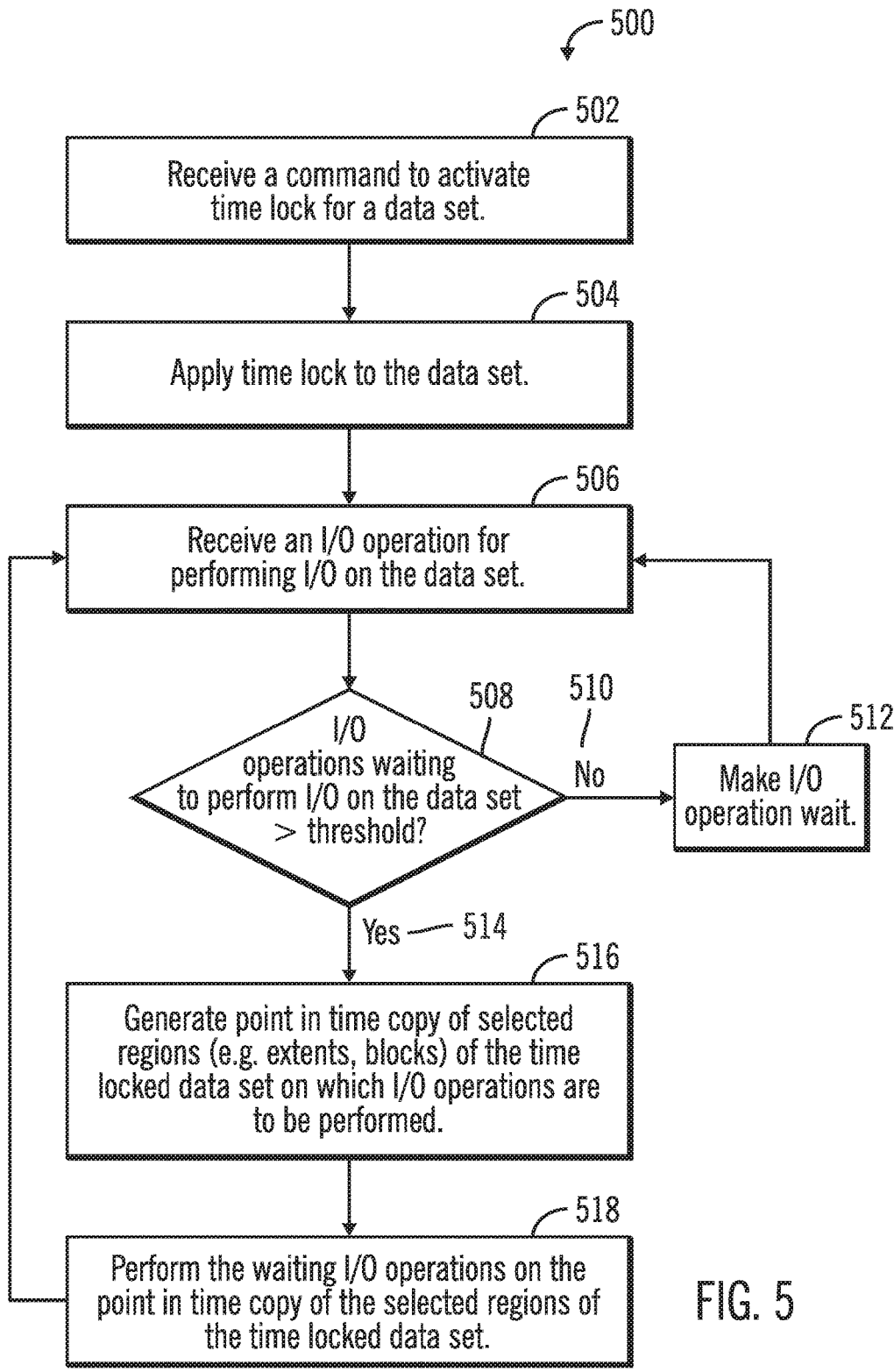
FIG. 5 illustrates a flowchart that shows a point in time copy being generated for selected regions of the time locked data set after waiting for a threshold number of I/O operations, in accordance with certain embodiments.

FIG. 5 illustrates a flowchart 500 that shows a point in time copy 118 being generated for selected regions 120 of the time locked data set 116 after waiting for a threshold number of I/O operations, in accordance with certain embodiments. The operations shown in FIG. 5 may be performed by the time lock management application 112 that executes in the storage controller 102.

Control starts at block 502 in which the time lock management application 112 receives a command to activate a time lock for a data set 116. The time lock management application 112 applies (at block 504) the time lock 114 to the data set 116. As a result, the data set 116 is time locked and cannot be accessed to perform I/O operations.

From block 504 control proceeds to block 506 in which the time lock management application 112 receives an I/O operation generated by a host for performing I/O on the data set 116. The I/O operation cannot be performed on the data set 116 that is time locked.

The time lock management application 112 determines (at block 508) whether the number of I/O operations waiting to perform I/O on the data set 116 exceeds a threshold, where the threshold may be a predetermined number. For example if the predetermined number is N, then the time lock management application 112 determines (at block 508) whether the number of I/O operations waiting to perform I/O on the data set exceeds the number N.

If at block 508 the time lock management application 112 determines that the number of I/O operations waiting to be performed I/O on the data set does not exceeds the threshold ("No" branch 510) then control proceeds to block 512 where the I/O operation is made to wait and then control returns to block 506 in which the next I/O operation is received.

If at block 508 the time lock management application 112 determines that the number of I/O operations waiting to perform I/O on the data set exceeds the threshold ("Yes" branch 514) then control proceeds to block 516, in which the time lock management application 112 generates the point in time copy of selected regions 120 (e.g., extents, blocks) of the time locked data set 116 where the I/O operations are waiting to be performed on the selected regions 120 of the time locked data set 116. Therefore, the point in time copy 118 of the time locked data set 116 is generated not only after the number of I/O operations waiting to perform I/O on the data set 116 exceeds the threshold, but the point in time copy 118 is performed only on selected regions 120 on the time locked data set 116. As a result, the generation of the point in time copy 118 is delayed until a sufficient number of I/O operations are waiting and the point in time copy 118 is performed much faster in comparison to generating the point in time copy of the entirety of the time locked data set 116.

Subsequent to generation of the point in time copy 118, the time lock management application 112 performs (at block 518) the waiting I/O operations on the point in time copy 118 of the selected regions 120 of the time locked data set 116, and control returns to block 506 for receiving additional I/O operations.

Therefore, FIG. 5 illustrates certain embodiments in which point in copy 118 is generated only for selected regions 120 of the data set 116 on which a predetermined number of I/O operations are waiting to be performed.

Figure 6:
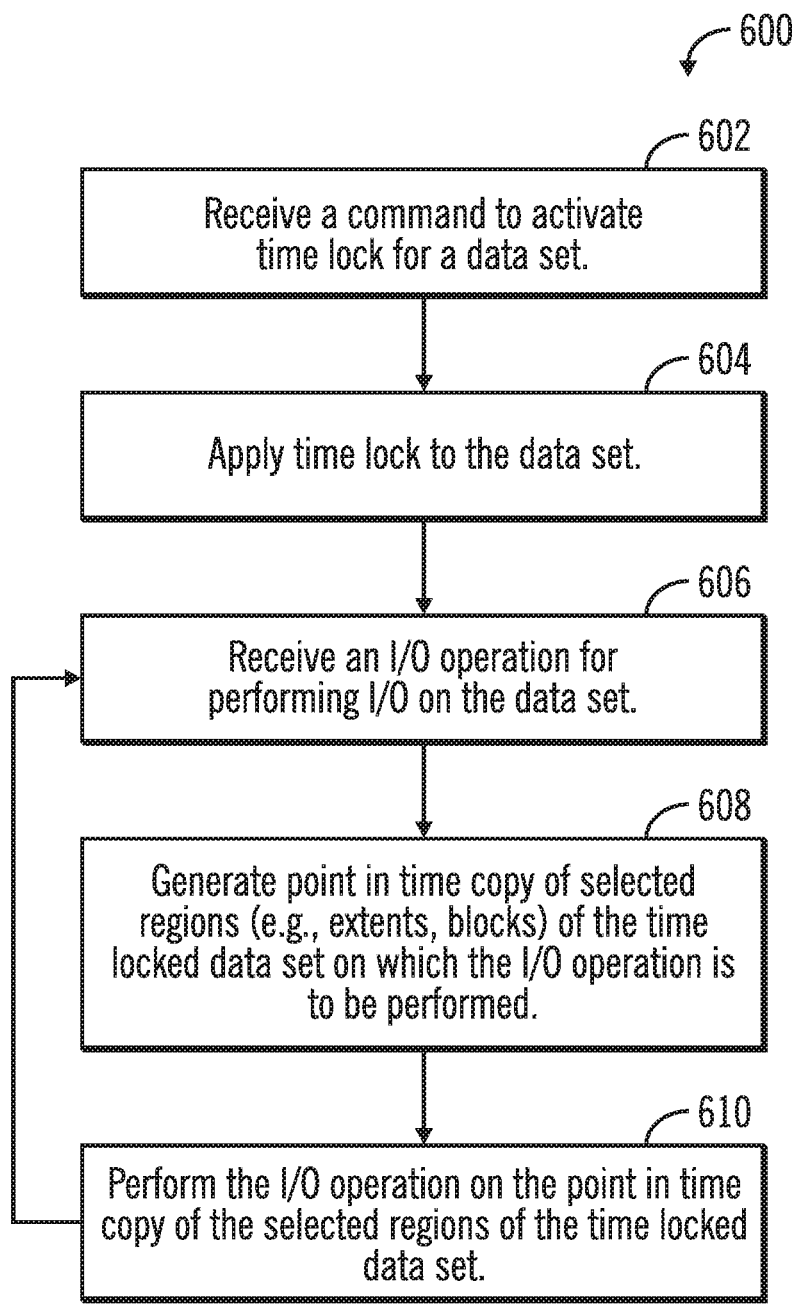
FIG. 6 illustrates a flowchart that shows point in time copy being generated for selected regions of the time locked data set, in accordance with certain embodiments.

FIG. 6 illustrates a flowchart 600 that shows point in time copy being generated for selected regions 120 of the time locked data set 116, in accordance with certain embodiments. The operations shown in FIG. 6 may be performed by the time lock management application 112 that executes in the storage controller 102.

Control starts at block 602 in which the time lock management application 112 receives a command to activate a time lock for a data set 116. The time lock management application 112 applies (at block 604) the time lock 114 to the data set 116. Control proceeds to block 606 in which the time lock management application 112 receives an I/O operation for performing an I/O on the data set 116, and then generates (at block 608) the point in time copy of selected regions 120 (e.g., extents, blocks, etc.) of the data set 116, where the I/O operation is for the selected regions.

Subsequent to generation of the point in time copy of the selected regions of the time locked data set 116, the time lock management application 112 performs (at block 610) the I/O operations on the point in time copy 118 of the selected regions 120 of the time locked data set 116.

Therefore, FIG. 6 illustrates certain embodiments in which the data set 116 is time locked, and processing time for generation of point in time copy 118 is reduced by generating only the point in time copy of those regions of the time locked data set on which I/O operations are requested to be performed.

Figure 7:
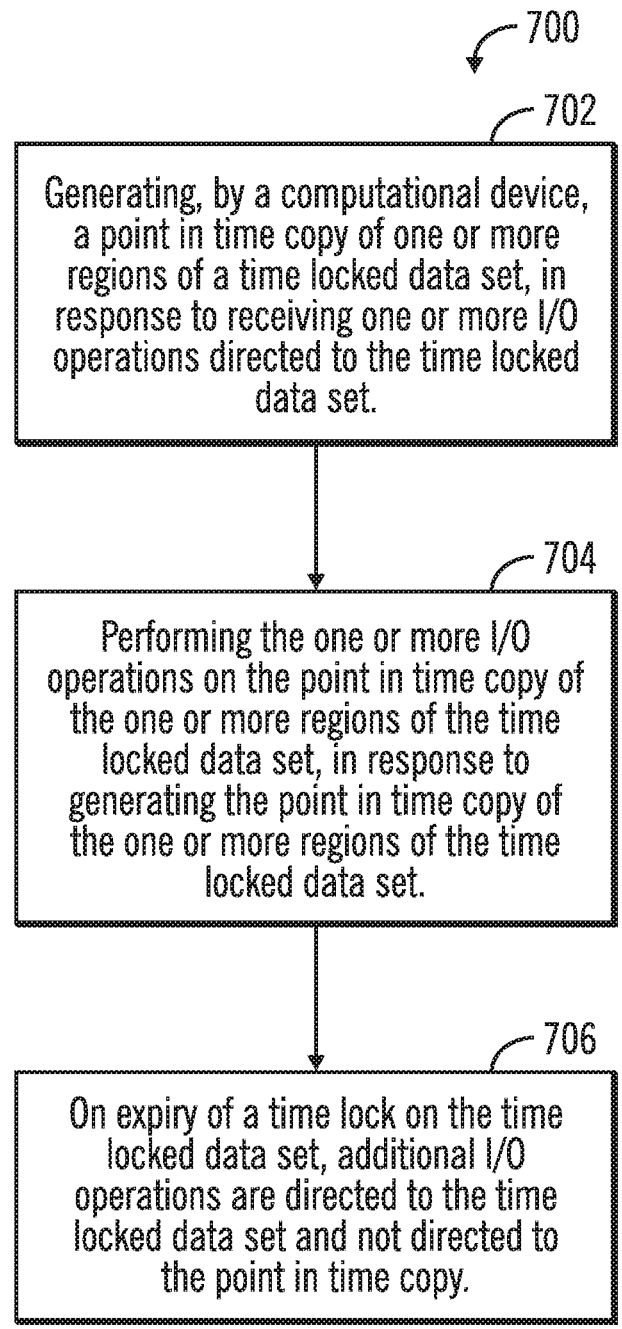
FIG. 7 illustrates a flowchart that shows a reduction of processing overhead for generating a point in time copy to allow access to time locked data, in accordance with certain embodiments.

FIG. 7 illustrates a flowchart 700 that shows a reduction of processing overhead for copying data to allow access to time locked data, in accordance with certain embodiments. The operations shown in FIG. 7 may be performed by the time lock management application 112 that executes in the storage controller 102.

Control starts a block 702 in which a computational device (e.g., storage controller 102) generates a point in time copy 118 of one or more regions (e.g., selected regions 120) of a time locked data set 116, in response to receiving one or more I/O operations (e.g., a predetermined number of I/O operations) directed to the time locked data set 116. In certain embodiments, the one or more regions comprise an entirety of the time locked data set, and in other embodiments, the one or more regions comprise those regions of the time locked data set to which the I/O operations are directed. The one or more regions may include one or more volumes or parts of volumes. In certain embodiments, the generating of the point in time copy of the one or more regions of the time locked data set is performed subsequent to the one or more I/O operations exceeding a predetermined threshold number. It may be noted that the computational device 102 prevents the I/O operations from being performed on the time locked data set 116.

From block 702 control proceeds to block 704 in which the one or more I/O operations are performed on the point in time copy of the one or more regions 120 of the time locked data set 116, in response to generating the point in time copy 118 of the one or more regions 120 of the time locked data set 116.

From block 704 control proceeds to block 706, in which on expiry of a time lock 114 on the time locked data set 116, additional I/O operations are directed to the previously time locked data set 116 that is now no longer subject to the time lock, and not directed to the point in time copy.

Therefore FIGS. 1-7 illustrate certain embodiments in which a point in time copy of a time locked data set is performed by waiting until a predetermined number of I/O operations are waiting for accessing the time locked data set. Furthermore, in certain embodiments only the regions of the data set that are to be accessed are subjected to the point in time copy operations.

Cloud Computing Environment

Cloud computing is a model for enabling convenient, on-demand network access to a shared pool of configurable computing resources (e.g., networks, servers, storage, applications, and services) that can be rapidly provisioned and released with minimal management effort or service provider interaction.

Figure 8:
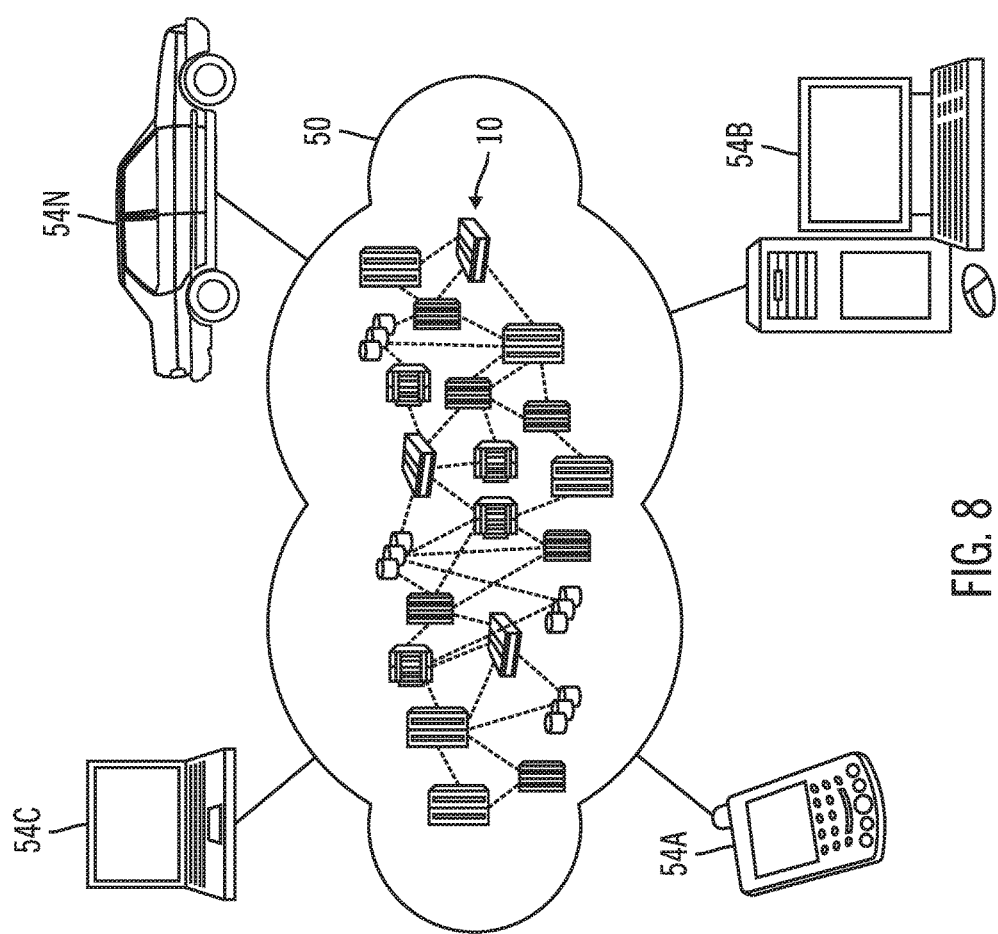
FIG. 8 illustrates a block diagram of a cloud computing environment, in accordance with certain embodiments.

Referring now to FIG. 8, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
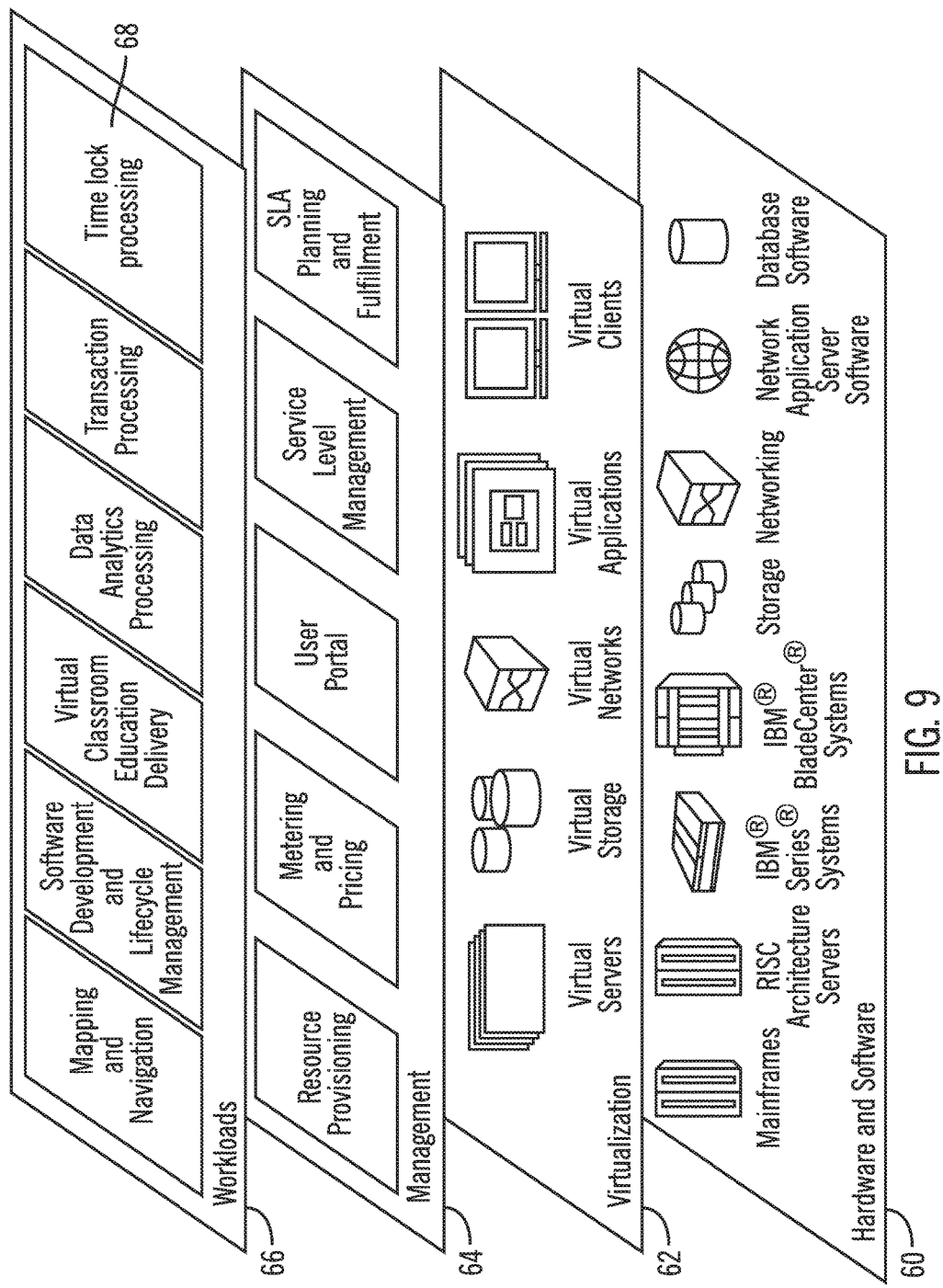
FIG. 9 illustrates a block diagram of further details of the cloud computing environment of FIG. 8, in accordance with certain embodiments.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto.

Hardware and software layer 60 includes hardware and software components. Examples of hardware components include mainframes, in one example IBM zSeries* systems; RISC (Reduced Instruction Set Computer) architecture based servers, in one example IBM pSeries* systems; IBM xSeries* systems; IBM BladeCenter* systems; storage devices; networks and networking components. Examples of software components include network application server software, in one example IBM WebSphere* application server software; and database software, in one example IBM DB2* database software.

* IBM, zSeries, pSeries, xSeries, BladeCenter, WebSphere, FlashCopy, and DB2 are trademarks of International Business Machines Corporation registered in many jurisdictions worldwide.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and time lock processing 68 as shown in FIGS. 1-9.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instruction.

Figure 10:
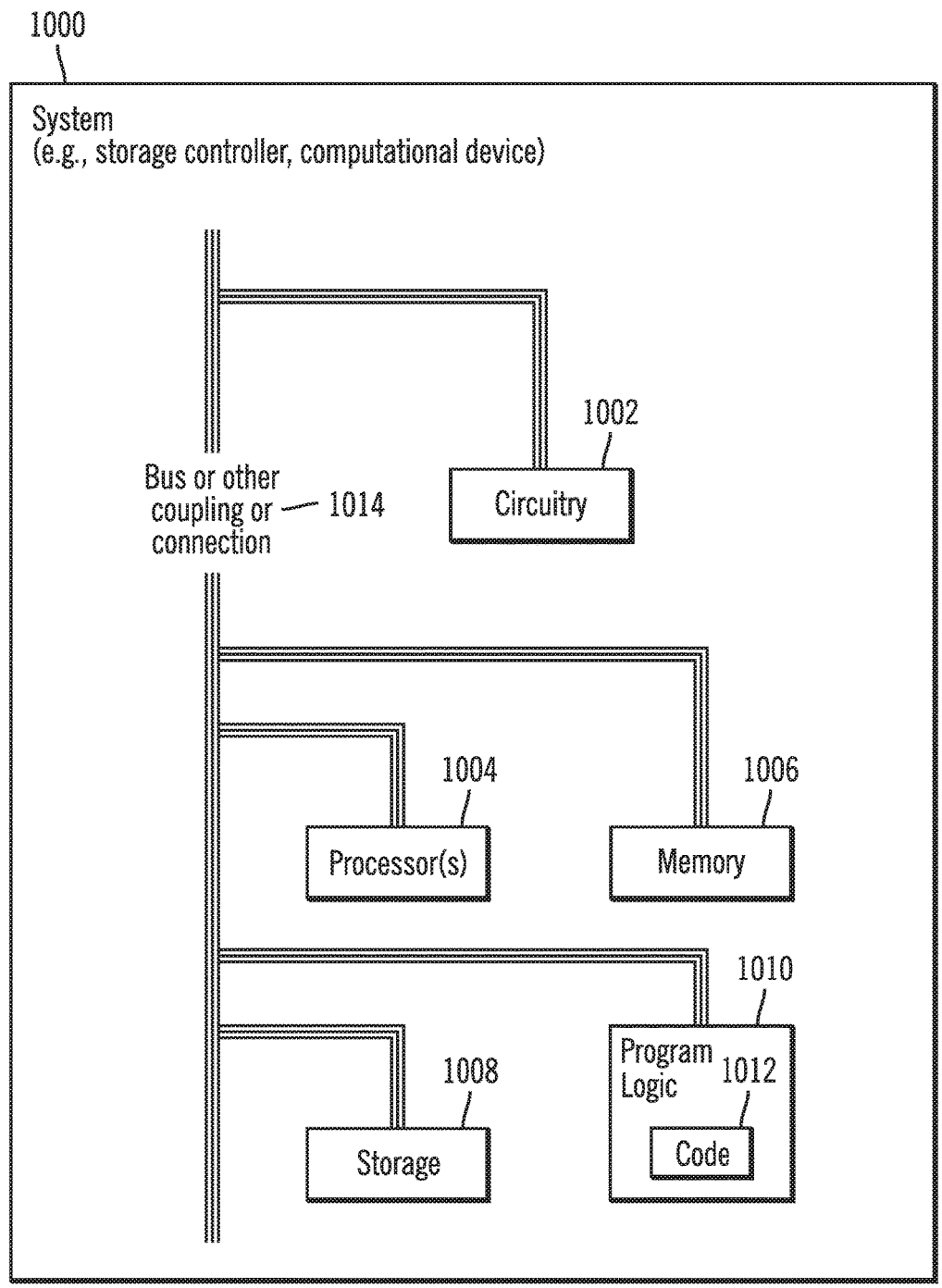
FIG. 10 illustrates a block diagram of a computational system that shows certain elements that may be included in the storage controller or the host, as described in FIGS. 1-9, in accordance with certain embodiments.

FIG. 10 illustrates a block diagram that shows certain elements that may be included in the storage controller 102, the hosts 104, 106, or other computational devices in accordance with certain embodiments. The system 1000 may include a circuitry 1002 that may in certain embodiments include at least a processor 1004. The system 1000 may also include a memory 1006 (e.g., a volatile memory device), and storage 1008. The storage 1008 may include a non-volatile memory device (e.g., EEPROM. ROM, PROM, flash, firmware, programmable logic, etc.), magnetic disk drive, optical disk drive, tape drive, etc. The storage 1008 may comprise an internal storage device, an attached storage device and/or a network accessible storage device. The system 1000 may include a program logic 1010 including code 1012 that may be loaded into the memory 1006 and executed by the processor 1004 or circuitry 1002. In certain embodiments, the program logic 1010 including code 1012 may be stored in the storage 1008. In certain other embodiments, the program logic 1010 may be implemented in the circuitry 1002. One or more of the components in the system 1000 may communicate via a bus or via other coupling or connection 1014. Therefore, while FIG. 10 shows the program logic 1010 separately from the other elements, the program logic 1010 may be implemented in the memory 1006 and/or the circuitry 1002.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
    generating, by a computational device, a point in time copy of one or more regions of a time locked data set, in response to receiving one or more Input/Output (I/O) operations directed to the time locked data set; and
    performing the one or more I/O operations on the point in time copy of the one or more regions of the time locked data set, in response to generating the point in time copy of the one or more regions of the time locked data set.

2. The method of claim 1, wherein the one or more regions comprise an entirety of the time locked data set.

3. The method of claim 1, wherein the one or more regions comprise those regions of the time locked data set to which the I/O operations are directed.

4. The method of claim 1, wherein the generating of the point in time copy of the one or more regions of the time locked data set is performed subsequent to the one or more I/O operations exceeding a predetermined threshold number.

5. The method of claim 1, the method further comprising:
    preventing the I/O operations from being performed on the time locked data set.

6. The method of claim 1, wherein the one or more regions include one or more volumes or parts of volumes in which the time locked data set is stored.

7. The method of claim 1, wherein on expiry of a time lock on the time locked data set, additional I/O operations are directed to the time locked data set and not directed to the point in time copy.

8. A system, comprising:
    a memory; and
    a processor coupled to the memory, wherein the processor performs operations, the operations comprising:
        generating a point in time copy of one or more regions of a time locked data set, in response to receiving one or more Input/Output (I/O) operations directed to the time locked data set; and
        performing the one or more I/O operations on the point in time copy of the one or more regions of the time locked data set, in response to generating the point in time copy of the one or more regions of the time locked data set.

9. The system of claim 8, wherein the one or more regions comprise an entirety of the time locked data set.

10. The system of claim 8, wherein the one or more regions comprise those regions of the time locked data set to which the I/O operations are directed.

11. The system of claim 8, wherein the generating of the point in time copy of the one or more regions of the time locked data set is performed subsequent to the one or more I/O operations exceeding a predetermined threshold number.

12. The system of claim 8, the operations further comprising:
    preventing the I/O operations from being performed on the time locked data set.

13. The system of claim 8, wherein the one or more regions include one or more volumes or parts of volumes in which the time locked data set is stored.

14. The system of claim 8, wherein on expiry of a time lock on the time locked data set, additional I/O operations are directed to the time locked data set and not directed to the point in time copy.

15. A computer program product, the computer program product comprising a computer readable storage medium having computer readable program code embodied therewith, the computer readable program code configured to perform operations on a processor of a computational device, the operations comprising:
    generating, by the computational device, a point in time copy of one or more regions of a time locked data set, in response to receiving one or more Input/Output (I/O) operations directed to the time locked data set; and
    performing the one or more I/O operations on the point in time copy of the one or more regions of the time locked data set, in response to generating the point in time copy of the one or more regions of the time locked data set.

16. The computer program product of claim 15, wherein the one or more regions comprise an entirety of the time locked data set.

17. The computer program product of claim 15, wherein the one or more regions comprise those regions of the time locked data set to which the I/O operations are directed.

18. The computer program product of claim 15, wherein the generating of the point in time copy of the one or more regions of the time locked data set is performed subsequent to the one or more I/O operations exceeding a predetermined threshold number.

19. The computer program product of claim 15, the operations further comprising:
    preventing the I/O operations from being performed on the time locked data set.

20. The computer program product of claim 15, wherein the one or more regions include one or more volumes or parts of volumes in which the time locked data set is stored.

21. The computer program product of claim 15, wherein on expiry of a time lock on the time locked data set, additional I/O operations are directed to the time locked data set and not directed to the point in time copy.

22. A storage controller, wherein the storage controller is configured to perform operations, the operations comprising:
    generating a point in time copy of one or more regions of a time locked data set, in response to receiving one or more Input/Output (I/O) operations directed to the time locked data set; and
    performing the one or more I/O operations on the point in time copy of the one or more regions of the time locked data set, in response to generating the point in time copy of the one or more regions of the time locked data set.

23. The storage controller of claim 22, wherein the one or more regions comprise an entirety of the time locked data set.

24. The storage controller of claim 22, wherein the one or more regions comprise those regions of the time locked data set to which the I/O operations are directed.

25. The storage controller of claim 22, wherein the generating of the point in time copy of the one or more regions of the time locked data set is performed subsequent to the one or more I/O operations exceeding a predetermined threshold number.

26. The storage controller of claim 22, the operations further comprising:
    preventing the I/O operations from being performed on the time locked data set.

27. The storage controller of claim 22, wherein the one or more regions include one or more volumes or parts of volumes in which the time locked data set is stored.

28. The storage controller of claim 22, wherein on expiry of a time lock on the time locked data set, additional I/O operations are directed to the time locked data set and not directed to the point in time copy.

* * * * *